United States Patent [19]

Mallary et al.

[11] Patent Number: 4,912,584
[45] Date of Patent: Mar. 27, 1990

[54] METHOD FOR FABRICATING MAGNETIC RECORDING POLES

[75] Inventors: Michael L. Mallary, Berlin; Richard A. Stander, Chelmsford, both of Mass.

[73] Assignee: Digital Equipment Corporation, Maynard, Mass.

[21] Appl. No.: 166,511

[22] Filed: Mar. 9, 1988

[51] Int. Cl.$^4$ .............................................. G11B 5/147
[52] U.S. Cl. .................... 360/126; 156/643; 156/656; 156/659.1; 156/661.1; 360/120
[58] Field of Search ............ 29/603; 427/128–131; 430/316, 319; 156/643, 646, 656, 659.1, 661.1, 664; 360/119–122, 125–127

[56] References Cited

U.S. PATENT DOCUMENTS

| 4,424,271 | 1/1984 | Keel et al. | 430/319 |
| 4,601,099 | 7/1986 | Nishiyama | 29/603 |
| 4,652,954 | 3/1987 | Church | 29/603 |

FOREIGN PATENT DOCUMENTS

| 0152326 | 8/1985 | European Pat. Off. | 29/603 |
| 59-30227 | 2/1984 | Japan | 29/603 |

*Primary Examiner*—Kenneth M. Schor
*Attorney, Agent, or Firm*—Fish & Richardson

[57] ABSTRACT

The poles are suited for mounting on the side of a slider carrying a magnetic head. The method allows very narrow gaps between poles. In one embodiment of the invention, a magnetic pole is deposited on a substrate. A nonmagnetic material such as Al$_2$O$_3$ is deposited from the side onto the pole and substrate. A preselected pattern of photoresist is next deposited on the nonmagnetic layer and a second magnetic material is deposited. The photoresist is removed and excess magnetic material is removed by ion milling from the side opposite to that of the nonmagnetic material deposition. Another embodiment is disclosed for making two- and three-pole heads.

18 Claims, 5 Drawing Sheets

METHOD FOR FABRICATING MAGNETIC RECORDING POLES

BACKGROUND OF THE INVENTION

This invention relates to magnetic heads adapted for mounting on the side of a slider.

In a typical thin film head located on the back of the slider, the pole piece is oriented perpendicularly to the direction of media travel (see FIG. 1). As shown in the figure, well defined magnetic domains 10 form in the pole tip 12, the pole having a width W and defining a track width TW. These "good" domains are capable of conducting flux by rotation of the polarization of the domains without changing the location of their wall boundaries. As shown in FIG. 2, as the width, W, of the pole tip 12 is decreased to W' to accommodate narrower track widths, TW', the domains 14 that form are "bad" in that they can conduct flux only by wall motion. That is, for the domains to change polarization, the boundary walls 16 move as shown in FIG. 3. (Media motion is perpendicular to the plane of the drawing in FIGS. 1-3 and along arrow M in FIG. 4.)

The problem with conduction of flux by wall motion is that the motion of the boundaries can be impeded by imperfections in the material. As the boundaries deform, they become temporarily stuck and only after the deformation is great enough does the boundary "snap" free of the imperfection. This sudden change in boundary location is the mechanism which generates Barkhausen noise.

To avoid decreasing the width of the pole sufficiently to result in flux conduction by wall motion, it has been suggested to mount the head on the edge of the slider rather than on the rear of the slider as is conventionally the case. By moving the pole to the side of the slider, the width of the track TW is determined by the thickness of the pole (T), not the width of the pole (W). Since pole width is not restricted, it can be made large enough for the formation of the "good" domains which do not require wall motion for conduction. FIG. 4 shows a pole 20 mounted on the side of a slider 22. Although side mounting of the transducer has been mentioned in the literature, the techniques used to create such a pole restricted the pole gap to three microns or greater. See, "A Yoke Type MR Head For High Track Density Recording", T. Maruyama et al., IEEE Conference on Magnetics, Tokyo, April, 1987 and K. Kanai et al., IEEE Trans. on Magn., MAG-11, No. 5, p. 1212, 1975. The reason that the pole gap was restricted to three microns or greater is that the gap was created by ion milling a slot and then depositing aluminum oxide within the slot. It is unlikely that this technique would be useful for creating gaps of the order of 0.5 microns as are currently used. Furthermore, the technique previously reported is incapable of making a three-pole head.

SUMMARY OF THE INVENTION

The present invention is concerned with methods of fabricating side of the slider mounted poles with narrow pole gaps including a three-pole transducer. According to one aspect of the invention, a base layer of a nonmagnetic material such as $Al_2O_3$ is deposited onto a slider substrate. A speed layer of a magnetic material such as NiFe is then deposited on top of the base layer. Next, a sheet of magnetic material such as NiFe is plated on top of the seed layer to a predetermined thickness. A photoresist layer is applied and patterned to define a first magnetic pole. Ion beam milling is then used to etch away the remaining, unprotected NiFe film and a predetermined amount of the base layer leaving the side walls as vertical as possible. The remaining photoresist layer is removed revealing the first pole. A non-magnetic gap layer ($Al_2O_3$) is next applied using ion beam deposition with a high degree of incidence (approximately 70° from the perpendicular). Because the base layer has been etched to a predetermined amount (depending on the desired gap layer thickness), the gap layer deposition will now fill in the previously etched region thereby nearly planarizing the first pole with the base layer. One variation of the above-described process is to create the first pole by through mask plating. Thereafter, a gap layer is deposited. After insulation and coil layers are deposited on the first pole by conventional techniques, a second pole is deposited using through mask plating. Any excess material remaining on the second pole is etched away using ion beam etching with a high degree of incidence, approximately 70° from perpendicular.

In another aspect of the invention a nonmagnetic seed layer such as TaAu serves as a substrate. A photoresist mask is applied to the substrate and steep angle deposition is used to deposit an inner gap material against the vertical side walls of the temporary block of photoresist. The horizontal surfaces are then ion milled with normal incidence to remove unwanted material that was deposited during the previous deposition step. The photoresist block is then stripped chemically and a new photoresist pattern is generated to define the desired geometry of the poles. The ceramic component of the gap forms a wall that is part of the plating mask at this point. The poles are then plated through this combined mask.

Yet another aspect of this invention results in a three-pole head by a process similar to the one described directly above. A photoresist mask is applied to a nonmagnetic seed layer substrate such as TaAu. Steep angle deposition is used to deposit inner gap material against the vertical side wall of the temporary block of photoresist. A magnetic material such as NiFe (middle pole) is deposited by steep angle deposition and steep angle deposition is again used to deposit a second layer of inner gap material against the vertical side walls of the NiFe. The horizontal surfaces are ion milled with normal incidence to remove unwanted material (ceramic and magnetic) that was deposited on them during the previous deposition steps. Aluminum oxide is again deposited at the same steep angle and the structure is ion milled once again. This latest step electrically isolates the thin NiFe pole from the seed layer. The photoresist block is chemically stripped away and a new photoresist pattern is generated to define the desired geometry of the poles. The ceramic and magnetic components of the gap form a wall that is part of the plating mask. The magnetic material such as NiFe is again plated in the proper geometry resulting in the three-pole head. A variation of the above three-pole process would laminate the central pole by depositing a very thin layer of ceramic by steep angle deposition after half of the middle pole is deposited. The second half of the pole follows and the process proceeds as before.

DESCRIPTION OF THE PREFERRED EMBODIMENTS

Figure 1:
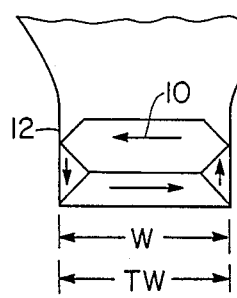
FIG. 1 is a schematic illustration of a magnetic recording pole.
Figure 2:
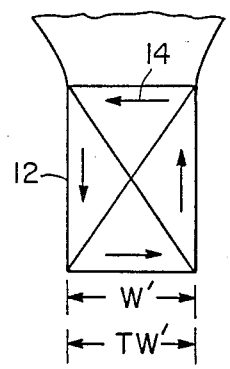
FIG. 2 is a schematic illustration of a pole narrower than the pole of FIG. 1.
Figure 3:
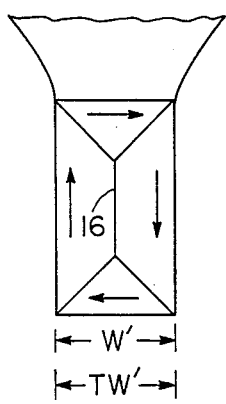
FIG. 3 is a schematic illustration of a pole showing flux conduction by wall motion.
Figure 4:
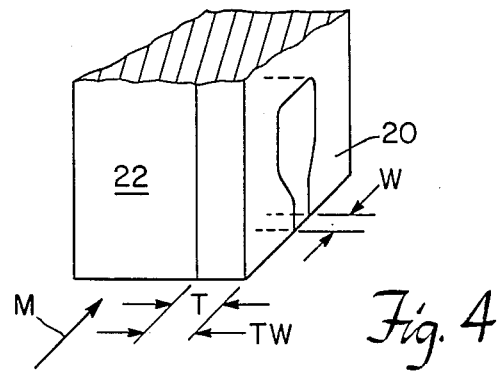
FIG. 4 is a perspective view of a pole mounted on the side of a slider.
Figure 5:
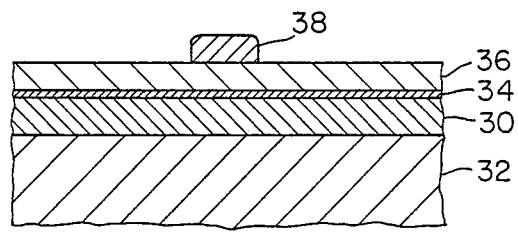
FIGS. 5, 6, and 7 are cross-sectional views of one of the processes disclosed herein.
Figure 6:
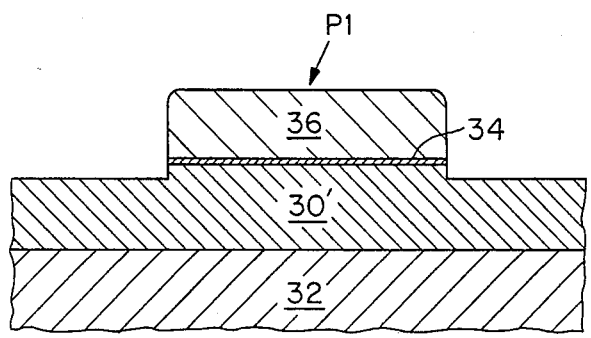
Figure 7:
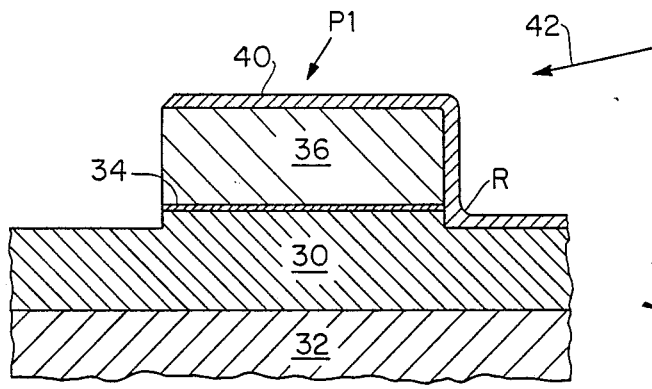

With reference now to FIG. 5, a magnetic recording pole according to one aspect of the invention begins with a base layer 30 of sputtered $Al_2O_3$ deposited onto a slider substrate 32. A seed layer 34 of NiFe is deposited on top of the base layer 30. Next, a sheet of magnetic material 36 such as NiFe is plated on top of the seed layer 34 to a predetermined thickness. A photoresist layer 38 is then applied to the layer 36 and patterned to define a first magnetic pole to be created from the layer 36. Ion beam milling is now used to etch away the remaining, unprotected NiFe film 36 and a predetermined amount of $Al_2O_3$ from the base layer 30 leaving the sidewalls as nearly vertical as possible. The photoresist 38 is then removed leaving a first pole, P1 (FIG. 6). With reference to FIG. 7, an $Al_2O_3$ gap layer 40 is now applied using ion beam deposition with a high degree incidence (approximately 70° from perpendicular) as shown by an arrow 42. Because the base layer 30 is etched to a predetermined amount (depending upon the desired gap layer thickness), the gap layer 40 deposition will now fill in the previously etched step nearly planarizing P1 with the base layer 30. The remaining offset is equal to a radial distance "R" of the $Al_2O_3$ deposited at the junction of the base layer 30 and the pole P1.

Figure 8:
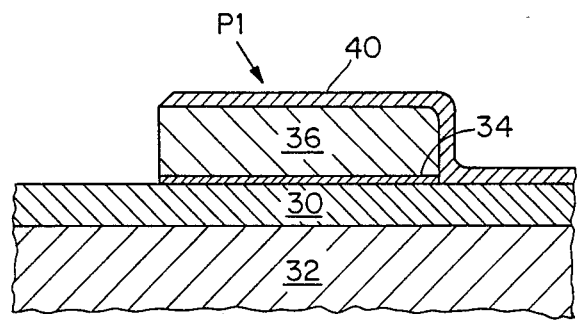
FIG. 8 is a cross-sectional view of another of the processes disclosed herein.

Another technique for making the first pole P1 is illustrated by FIG. 8. In this procedure, the NiFe layer 36 which forms the pole P1 is deposited by through mask plating on the seed layer 34. Thereafter the gap layer 40 is deposited over P1. In this case the planar offset equal to the gap layer 40 thickness and fillet radius is tolerated.

Figure 9:
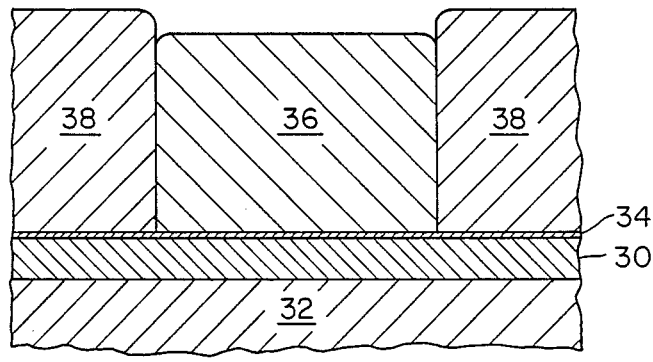
FIGS. 9 and 10 are cross-sectional views of yet another process disclosed herein.
Figure 10:
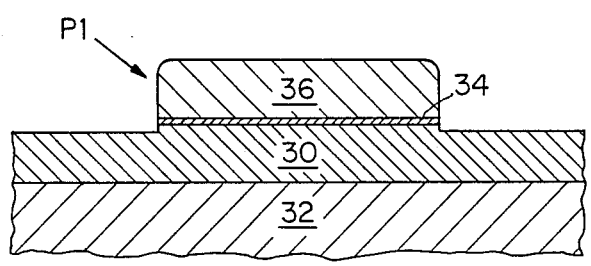

If this planar offset is undesirable, then a thicker layer 36 can be deposited using through mask plating as shown in FIG. 9. The photoresist portions 38 provide the masking. The structure in FIG. 9 is then ion beam etched after photoresist removal to yield the correct base layer 30 and pole P1 thickness as shown in FIG. 10.

Figure 11:
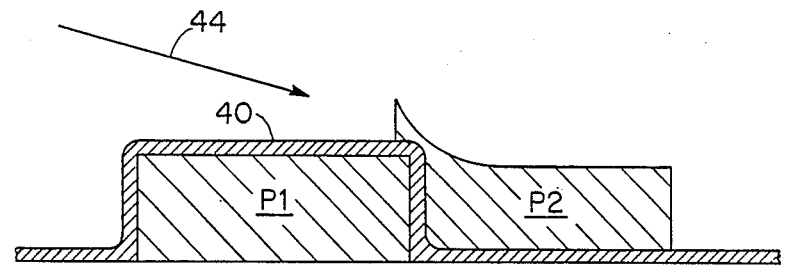
FIG. 11 is a cross-sectional view of a two-pole head.

After the pole P1 is made by any of the foregoing procedures, insulation and coil layers (not shown) are deposited using conventionally known techniques. With reference to FIG. 11, a second NiFe pole P2 is then deposited using through mask plating. The pole tip of pole P2 is carefully aligned to the edge of the pole tip of pole P1 so that both pole tips appear on the same horizontal plane. Since the pole tip of pole P2 has to be in intimate contact with the gap layer 40, P2 must be either perfectly aligned to the edge of P1 or slightly overlapping as shown in FIG. 11. After pole P2 is plated, photoresist is removed and any excess material from P2 can now be etched away using ion beam etching with a high degree of incidence, approximately 70° from perpendicular as shown by an arrow 44 in FIG. 11.

Figure 12:
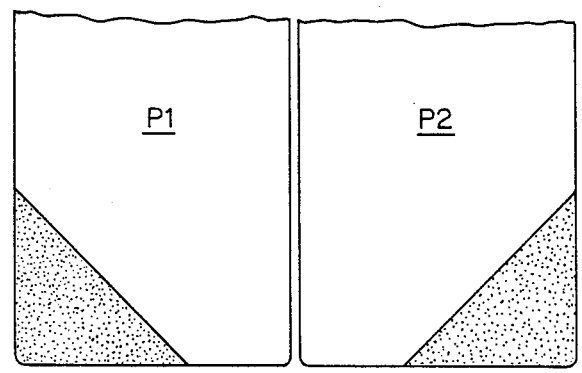
FIG. 12 is a front view of a two-pole head having sculptured pole tips.

Because both P1 and P2 pole tips now appear on the same horizontal plane, it is possible to perform additional processing that allows the pole tips to be sculptured by means of ion beam etching to enhance magnetic performance. Such sculpturing is shown in FIG. 12.

In addition to the previously mentioned advantages in magnetic performance, the above-described processes have several additional advantages. In a conventional recording head, track width is bound by the limits of the microlithography used in the processing. In the side mounting transducer head of the present invention, track width is now determined by deposition thickness and the ability to align pole P1 with pole P2, both of which can be tightly controlled. Also, the previously indicated problems of pole gap thickness are eliminated, because the gap layer thickness is controlled by deposition thickness and not microlithography. By repeating the steps for defining pole P2, it is possible to incorporate an additional pole tip for use in a three-pole head.

Figure 13:
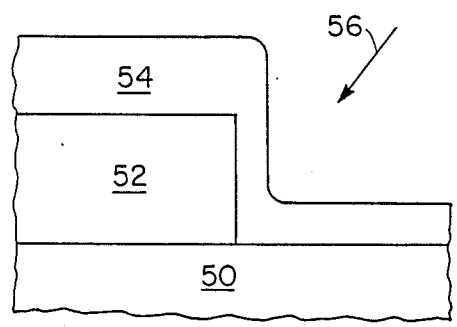
FIGS. 13, 14, and 15 (i.e. 15a and 15b) are cross-sectional views of another process disclosed herein.
Figure 14:
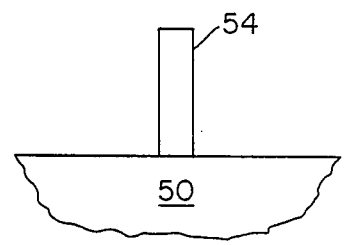
Figure 15A:
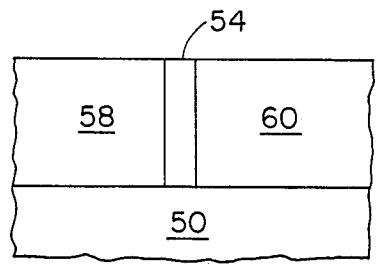
Figure 15B:
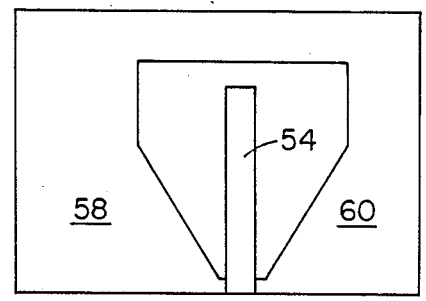
Figure 16:
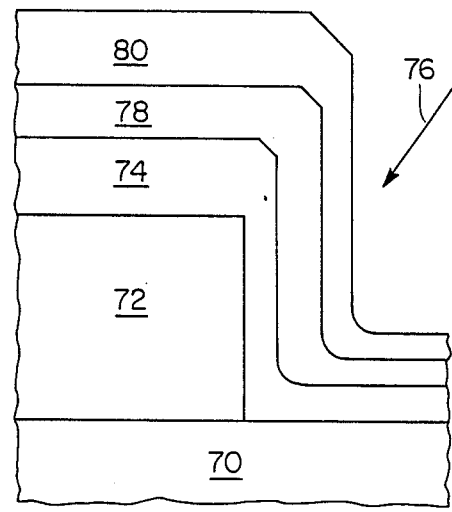
FIGS. 16, 17, 18, and 19 (i.e. 19a and 19b) are cross-sectional views illustrating the process for making a three-pole head.

An alternate process will now be described in conjunction with FIGS. 13–15. In this process, a nonmagnetic seed layer such as TaAu serves as a substrate 50. A photoresist mask 52 having substantially vertical walls is applied to the substrate 50. Steep angle deposition is used to deposit an inner gap material such as $Al_2O_3$ against the vertical side wall of the photoresist 52 forming a layer 54. The $Al_2O_3$ is deposited from the side along a direction shown by an arrow 56. The horizontal surfaces are then ion milled with normal incidence to remove unwanted material. A preferred ion milling material is $CF_4$ which will preferentially remove $Al_2O_3$. Next, the photoresist block 52 is stripped away chemically which leaves the $Al_2O_3$ portion 54 shown in FIG. 14. A new photoresist pattern is generated to define the geometry of the poles and the ceramic and magnetic components of the gap form a wall that is part of the plating mask at this step in the process. Poles 58 and 60 (FIG. 15a) are then plated through this combined mask. A side view of the completed pole is shown in FIG. 15b.

Figure 17:
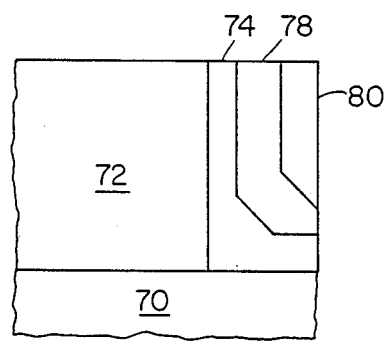
Figure 18:
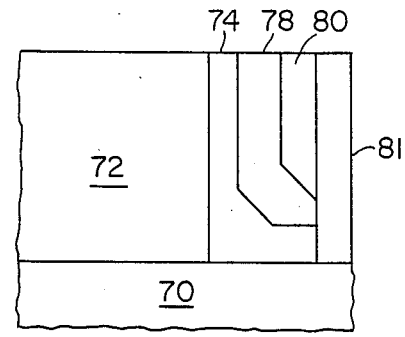
Figure 19A:
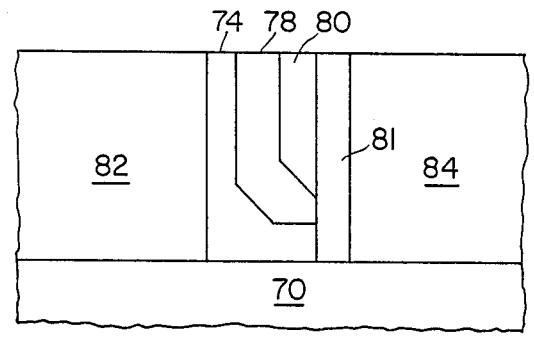
Figure 19B:
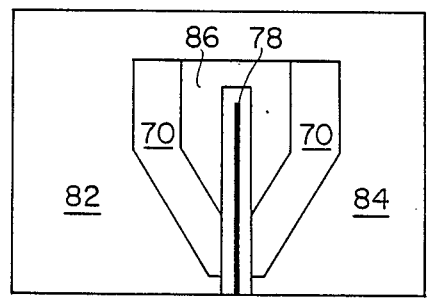

A process for making a three-pole head will now be described in conjunction with FIGS. 16–19 which are not drawn to scale. A nonmagnetic seed layer 70 such as TaAu serves as a substrate. A photoresist mask 72 is applied to the substrate 70. Steep angle deposition is used to deposit inner gap material such as $Al_2O_3$ against the vertical side wall of the block of photoresist 72 to form a layer 74. The $Al_2O_3$ is deposited in the direction of an arrow 76. A magnetic material such as NiFe is deposited to form a layer 78. It is important to note that the NiFe layer 78 could actually be a laminated structure by including the process steps required for the production of a laminate. Steep angle deposition is used once again to deposit inner gap material against the vertical side walls of the NiFe layer 78 to form a layer 80. The horizontal surfaces are then ion milled with normal incidence to remove unwanted material (ceramic and magnetic) that was deposited during previous deposition steps. The pole after the ion milling step is shown in FIG. 17. Alumina 81 is again deposited and the structure is ion milled again, resulting in the structure shown in FIG. 18. The photoresist block 72 is stripped chemically and a new photoresist pattern is generated to define the geometry of the poles to be created. The ceramic and magnetic components of the gap form a wall that is part of the plating mask at this point in the process. NiFe is again plated in the proper geometry to create the pole structures 82, 84 shown in FIG. 19a and 86 shown in FIG. 19b. A side view of the completed pole structure is shown in FIG. 19b. Layer 86 is included to beef up the central pole for higher head efficiency.

This design most naturally uses a solenoidal coil. In this case, half of the coil must be deposited before the sequence described above and the other half afterwards.

A benefit of the techniques disclosed herein is that the thickness of the pole can be controlled very precisely because it is plated, whereas the width of the pole in previous implementations was determined by the masking operation and was therefore less controllable.

The structures made according to the present invention avoid the poor domain structure that develops when pole width is reduced in response to decreased track width. The techniques disclosed herein also reduce the amount of error in the definition of the pole edges which is caused by uncertainties in the process of removing material from the pole edge.

It is recognized that modifications and variations of the invention will occur to those skilled in the art and it is intended that all such modifications and variations be included within the scope of the appended claims.

What is claimed is:

1. A method for fabricating a magnetic head comprising the sequential steps of:
   (1) creating a first magnetic pole from magnetic material by forming said first pole over a substrate such that the pole has at least approximately vertical side walls;
   (2) depositing a nonmagnetic material layer obliquely from one side onto the substrate and a vertical side wall of the first pole formed in step (1) and defining a nonmagnetic gap region thereby on the first pole vertical side wall;
   (3) applying a preselected mask pattern of photoresist on the nonmagnetic layer after the deposition of a seed layer;
   (4) plating a magnetic material to form a second pole over the nonmagnetic layer through the photoresist mask, thus defining the nonmagnetic gap region as a gap layer between the first and second poles;
   (5) removing the photoresist; and
   (6) removing excess magnetic material by ion milling from the opposite side from the nonmagnetic material deposition.

2. The method of claim 1 wherein the magnetic material is NiFe.

3. The method of claim 1 wherein the substrate and the nonmagnetic material are $Al_2O_3$, the substrate being formed on a slider substrate.

4. The method of claim 1 wherein the first magnetic pole is created by:
   (1) sputtering an $Al_2O_3$ base layer on a slider substrate;
   (2) depositing a seed layer of a magnetic material on top of the base layer;
   (3) plating a sheet of magnetic material on top of the seed layer to a predetermined thickness;
   (4) applying a photoresist layer to the sheet of magnetic material and patterning the photoresist to define a first magnetic pole;
   (5) etching the unprotected magnetic material and a predetermined amount of the $Al_2O_3$ in the base layer by ion beam milling; and
   (6) removing the photoresist.

5. The method of claim 1 wherein the first magnetic pole is created by sputtering a base layer of $Al_2O_3$ onto a slider substrate;
   depositing a seed layer of a magnetic material on top of the base layer and through mask plating a magnetic material on the seed layer.

6. A method for fabricating a magnetic head comprising the sequential steps of:
   (1) applying a photoresist mask having substantially vertical side walls to a nonmagnetic seed layer substrate on a carrier substrate;
   (2) steep angle depositing a nonmagnetic material against the vertical side walls of the photoresist mask;
   (3) ion milling the horizontal surfaces with normal incidence, and leaving a portion of the material deposited in step (2) to act as a gap layer between the poles plated in step (5), this material forming a wall;
   (4) chemically stripping the photoresist mask and applying a new photoresist pattern to define the geometry of the poles to be plated in step (5), this new pattern and the gap material wall forming a pole mask;
   (5) plating magnetic material through the pole mask to form the poles of the head.

7. The method of claim 6 wherein the magnetic material is NiFe.

8. The method of claim 6 wherein the nonmagnetic material is $Al_2O_3$.

9. The method of claim 6 wherein the carrier substrate is TaAu.

10. The method of claim 6 wherein step (3) includes the use of $CF_4$ as ion milling material.

11. A magnetic head fabricated according to the method of claim 6.

12. A method for fabricating a three-pole magnetic head comprising the sequential steps of:
   (1) applying a photoresist mask to a nonmagnetic seed layer substrate;
   (2) depositing the steep angle deposition an inner gap of nonmagnetic material against a vertical side wall of the photoresist;
   (3) depositing a magnetic material by steep angle deposition upon the inner gap nonmagnetic material to form a central pole;
   (4) steep angle deposition a nonmagnetic material to form a nonmagnetic structure against a vertical side of the magnetic material;
   (5) ion milling horizontal surfaces of the workpiece after step (4) with normal incidence;
   (6) depositing a nonmagnetic layer onto the nonmagnetic structure formed in step (4) at a steep angle followed by ion milling at normal incidence;
   (7) chemically stripping the photoresist and generating a new photoresist pattern to define the geometry of two outer poles; and
   (8) depositing a magnetic material having a desired geometry by through mask plating, at least to form the two outer poles.

13. The method of claim 12 wherein the magnetic material is NiFe.

14. The method of claim 12 wherein the nonmagnetic material is $Al_2O_3$.

15. The method of claim 12 wherein the substrate is TaAu.

16. The method of claim 12 wherein step (5) includes the use of $CF_4$ as ion milling material.

17. A three-pole head fabricated according to the method of claim 12.

18. A three-pole head fabricated according to the method of claim 12 in which the central pole is laminated.

* * * * *